(12) United States Patent
Bai et al.

(10) Patent No.: US 10,666,907 B2
(45) Date of Patent: May 26, 2020

(54) INTERNAL VIDEO MONITORING SYSTEM AND METHOD FOR GIS DEVICE

(71) Applicant: CHINA XD ELECTRIC CO., LTD, Shaanxi (CN)

(72) Inventors: Shijun Bai, Shaanxi (CN); Yongqiang Zhang, Shaanxi (CN); Jizhou Duan, Shaanxi (CN); Haiqiang Wang, Shaanxi (CN); Rui Ye, Shaanxi (CN)

(73) Assignee: China XD Electric Co., Ltd., Shaanxi (CN)

( * ) Notice: Subject to any disclaimer, the term of this patent is extended or adjusted under 35 U.S.C. 154(b) by 469 days.

(21) Appl. No.: 15/329,058

(22) PCT Filed: Oct. 14, 2015

(86) PCT No.: PCT/CN2015/091906
§ 371 (c)(1),
(2) Date: Jan. 25, 2017

(87) PCT Pub. No.: WO2016/058526
PCT Pub. Date: Apr. 21, 2016

(65) Prior Publication Data
US 2017/0214888 A1   Jul. 27, 2017

(30) Foreign Application Priority Data

Oct. 14, 2014   (CN) .......................... 2014 1 0542496

(51) Int. Cl.
*H04N 7/18*   (2006.01)
*H04N 5/225*   (2006.01)
(Continued)

(52) U.S. Cl.
CPC ............. *H04N 7/181* (2013.01); *H02B 1/306* (2013.01); *H04N 5/2252* (2013.01); *H04N 5/2257* (2013.01); *H04N 5/37455* (2013.01)

(58) Field of Classification Search
CPC .... H04N 7/181; H04N 5/2252; H04N 5/2257; H04N 5/37455; H02B 1/306
(Continued)

(56) References Cited

U.S. PATENT DOCUMENTS 5,859,590 A * 1/1999 Otani ................... H02H 1/0015
324/520
6,501,572 B1   12/2002 Poth et al.
(Continued)

FOREIGN PATENT DOCUMENTS

CN          101274636 A    10/2008
CN          201450263 U     5/2010
(Continued)

OTHER PUBLICATIONS

PCT International Search Report dated Jan. 19, 2016 for PCT International Application No. PCT/CN2015/091906 (14 pages).
(Continued)

*Primary Examiner* — Jayanti K Patel
*Assistant Examiner* — Richard B Carter
(74) *Attorney, Agent, or Firm* — RMCK Law Group PLC

(57) ABSTRACT

Provided are a gas insulated switchgear (GIS) internal video monitoring system and a GIS internal video monitoring method. The GIS internal video monitoring system includes a GIS video sensor installed on a GIS enclosure and configured to acquire an open/close state of a GIS internal conductor in a real time manner, an intelligent power source module, a video server, and a video monitoring background system configured to control the intelligent power source module to supply power to the video sensor, where the GIS video sensor is connected with the video monitoring background system through the video server.

7 Claims, 5 Drawing Sheets

(51) Int. Cl.
*H02B 1/30* (2006.01)
*H04N 5/3745* (2011.01)

(58) Field of Classification Search
USPC .............. 348/14.01, 143, 82; 324/415, 520; 700/295; 361/118
See application file for complete search history.

(56) References Cited

U.S. PATENT DOCUMENTS

| | | | | |
|---|---|---|---|---|
| 7,310,111 | B2* | 12/2007 | Ramirez-Diaz | G08B 13/1961 348/143 |
| 7,382,596 | B2* | 6/2008 | DeBella | H04N 5/77 361/118 |
| 7,408,357 | B2 | 8/2008 | Adam et al. | |
| 7,816,924 | B2* | 10/2010 | Kanazawa | H01H 1/0015 324/415 |
| 2002/0116092 | A1* | 8/2002 | Hamamatsu | H02H 3/05 700/295 |
| 2009/0015991 | A1 | 1/2009 | Hyrenbach et al. | |
| 2012/0019687 | A1 | 1/2012 | Razavi et al. | |
| 2018/0301279 | A1* | 10/2018 | Klaponski | H01F 27/02 |

FOREIGN PATENT DOCUMENTS

| | | |
|---|---|---|
| CN | 201577153 U | 9/2010 |
| CN | 201750512 U | 2/2011 |
| CN | 201829858 U | 5/2011 |
| CN | 201955435 U | 8/2011 |
| CN | 202103755 U | 1/2012 |
| CN | 202496020 U | 10/2012 |
| CN | 202631917 U | 12/2012 |
| CN | 102938540 A | 2/2013 |
| CN | 103022903 A | 4/2013 |
| CN | 103647347 A | 3/2014 |
| CN | 104020411 A | 9/2014 |
| CN | 104320614 A | 1/2015 |
| CN | 204177926 U | 2/2015 |
| JP | 2009077349 A | 4/2009 |
| KR | 20130002470 A | 1/2013 |
| RU | 2339111 C2 | 11/2008 |
| RU | 83677 U1 | 6/2009 |
| WO | 2007093575 A1 | 8/2007 |

OTHER PUBLICATIONS

First Chinese Office Action for Application No. 201410542496.5 dated Feb. 3, 2017 and English Translation, 22 pages.
First Office Action for Russian Application No. 2017101375 dated Aug. 21, 2017 and English Translation, 17 pages.
Second Office Action for Chinese Application No. 201410542496.5 dated Aug. 21, 2017 and English Translation, 24 pages.
Written Opinion for Singapore Application No. 11201700020P dated Aug. 21, 2017, 10 pages.

* cited by examiner

INTERNAL VIDEO MONITORING SYSTEM AND METHOD FOR GIS DEVICE

This application is a National Stage application of PCT international application PCT/CN2015/091906, filed on Oct. 14, 2015, which claims the priority to Chinese Patent Application No. 201410542496.5, titled "INTERNAL VIDEO MONITORING SYSTEM AND METHOD FOR GIS DEVICE", filed on Oct. 14, 2014 with the State Intellectual Property Office of People's Republic of China, both of which are incorporated herein by reference in their entireties.

FIELD

The disclosure relates to the technical field of an intelligent online monitoring equipment for a high-voltage electrical apparatus of a smart grid, and in particular to a GIS internal video monitoring system.

BACKGROUND

A gas insulated switchgear (GIS), which is one of the most important apparatuses of an electrical power system, functions to ensure safe operation of the electrical power system and control circuits of the electrical power system, thus an operation state of the GIS may have an impact on the security of the entire electrical power system.

Due to the complicated structure of the GIS, unpredictable mechanical or electrical failures during a long-term operation of the GIS often result in indicated open/close states of switchgears contacts deviating from actual open/close states of the switchgears contacts, or the switchgears contacts being closed or opened incompletely. Since the contacts are encapsulated inside the GIS, actual positions of the contacts can not be obtained directly, which may result in failures in the safe operation of the GIS.

In order to monitor directly the open/close states of the switchgears and to avoid failures in the operation of the GIS, video monitoring on the GIS appears as a straightforward and effective approach to achieve this.

SUMMARY

The embodiments of the present disclosure provide a GIS internal conductor monitoring system and a GIS internal conductor monitoring method. According to the technical solution of the embodiments of the present disclosure, online monitoring of open/close states of a disconnector contact, an earthing switch contact, and a fast earthing switch contact in the GIS may be achieved. According to the technical solution of the embodiments of the present disclosure, the technical issue in illumination and tightness in a case that a video sensor is installed within a GIS enclosure can be solved, and a video signal is converted to a digital signal to implement remote video monitoring of the switch contacts within the enclosure of the GIS, thereby providing an effective technical means for monitoring positions of the disconnector contact, the earthing switch contact, and the fast earthing switch contact.

In one aspect, a gas insulated switchgear (GIS) internal video monitoring system is provided according to the embodiments of the disclosure, which includes: a GIS video sensor, an intelligent power source module, a video server, and a video monitoring background system, where the GIS video sensor installed within a GIS enclosure is configured to acquire an open/close state of a GIS internal conductor in a real time manner; the GIS video sensor is connected with the video monitoring background system through the video server, and the video monitoring background system is configured to control the intelligent power source module to supply power to the video sensor.

Communication between the video server and the video monitoring background system may be performed in accordance with the TCP/IP protocol.

Each of a power input terminal and a signal output terminal of the video sensor may be provided with a surge protector.

The video monitoring background system may include a main program module, a data management module, an information exchange module and a signal decoding and processing module, and the main program module is connected with the data management module, the information exchange module and the signal decoding and processing module.

The video sensor may include an inspection window housing fixed on the GIS enclosure; an interface between the inspection window housing and the GIS enclosure is made of light-transmitting glass; a light source, a photo-sensitive element are arranged within the inspection window housing; and an insulating sleeve is provided on an outer circumference of the photo-sensitive element.

A light source, and a photo-sensitive element may be respectively arranged within two parallel chambers of an inspection window housing.

An O-type shield ring may be arranged between an inspection window housing and the GIS enclosure.

In another aspect, a GIS internal video monitoring method based on the GIS internal video monitoring system is provided according to the embodiments of the disclosure, where the GIS internal video monitoring system includes a GIS video sensor, an intelligent power source module, a video server, and a video monitoring background system, where the GIS video sensor installed within a GIS enclosure is configured to acquire an open/close state of a GIS internal conductor in a real time manner; the GIS video sensor is connected with the video monitoring background system through the video server, and the video monitoring background system is configured to control the intelligent power source module to supply power to the video sensor, and the method includes:

acquiring, by the video sensor, the open/close state of the GIS internal conductor in a real time manner;

transmitting, by the video sensor, the open/close state to the video server in the form of a video signal via cable;

converting, by the video server, the video signal to a digital signal after the video server receives the video signal;

transmitting, by the video server, the digital signal to the video monitoring background system in accordance with the TCP/IP communication protocol;

decoding and analyzing, by the video monitoring background system, the digital signal; and displaying, by the video monitoring background system, an acquired analysis result to a user in the form of a screen.

The video monitoring background system may start up the intelligent power source module only when the video monitoring background system is to receive the video signal.

The decoding and analyzing, by the video monitoring background system, the digital signal may include:

identifying, by the video monitoring background system, different video information flows based on IP addresses and channel numbers after the video monitoring background system receives the video signal;

starting up, by the video monitoring background system, the intelligent power source module after the video information flows are identified correctly;

decoding and recoding, by the video monitoring background system, the received video signal to acquire a serial number of the video sensor;

categorizing, by the video monitoring background system, sensor data, extracting, by the video monitoring background system, an effective video image and storing, by the video monitoring background system, the video image; and closing, by the video monitoring background system, a monitoring video window and transmitting, by the video monitoring background system, an instruction to turn off the intelligent power source module to the intelligent power source module.

The embodiments of the present disclosure may have at least the following advantages and positive effects. A video indicating the positions of the disconnector contact, the earthing switch contact, and the fast earthing switch contact is acquired, and the acquired video information is converted to the digital signal by the video server and then the digital signal is inputted into the video monitoring background system where the digital signals are managed collectively. In this way, after operation of the disconnector, the earthing switch, or the fast earthing switch in the GIS is performed, actual open/close states of the switch contacts may be acquired to determine whether the contacts are closed or opened completely, therefore reliable operation of the GIS is ensured.

DETAILED DESCRIPTION OF THE EMBODIMENTS

Technical solutions according to embodiments of the present disclosure are described clearly and completely hereinafter in conjunction with the drawings. It is apparent that the described embodiments are only a part rather than all of the embodiments according to the present disclosure. Any other embodiments obtained by those skilled in the art based on the embodiments in the present disclosure without any creative work fall in the protection scope of the present disclosure.

Figure 1:
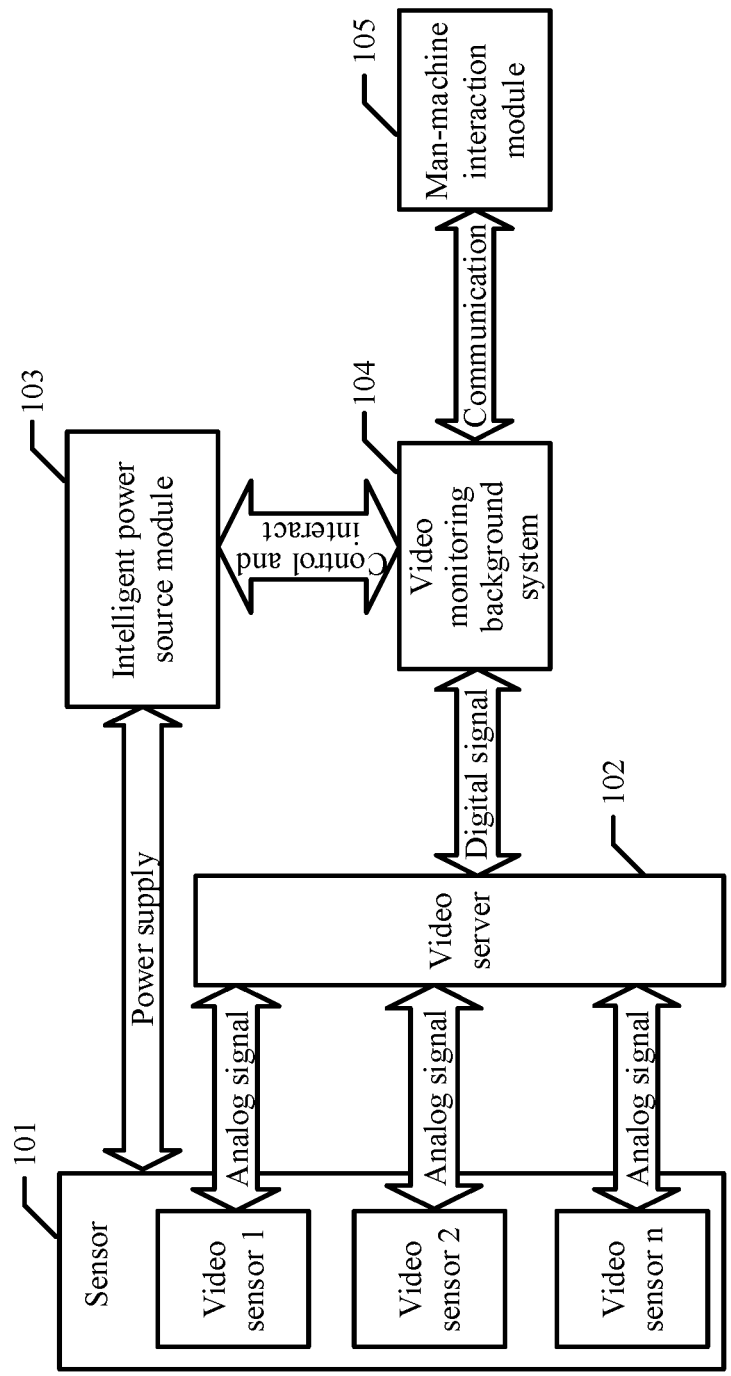
FIG. 1 is a principle diagram of a GIS internal video monitoring system.

A GIS internal video monitoring system is provided according to the embodiments of the present disclosure, which includes a video sensor (101), a video server (102), an intelligent power source module (103), a video monitoring background system (104), and a man-machine interaction module (105). As shown in FIG. 1, one or more video sensors are included. The video sensor installed within a GIS enclosure is configured to acquire an open/close state of a GIS internal conductor in a real time manner, where the open/close state of the GIS internal conductor includes open/close states of the disconnector contact, the earthing switch contact, and the fast earthing switch contact. The video sensor (101) is connected with the video server (102) via cable. The video monitoring background system (104) controls the intelligent power source module (103) to supply power to the video sensor (101), and communicates with the video server (102) to acquire a video digital signal which is encoded by using H.264 coding standard. The video server (102) is connected with the video monitoring background system (104) via network cable. The video sensor (101) installed within the GIS enclosure acquires a GIS internal video signal and transmits the video analog signal to the video server (102) via the cable. The video server (102) converts the video analog data to a digital signal and transmits the video data to the video monitoring background system (104) in accordance with the TCP/IP protocol (network communication protocol). After decoding and analyzing the digital signal, the video monitoring background system displays a monitoring screen to a user.

During operation of the entire monitoring system, the sensor is powered under control of the intelligent power source module (103). The video monitoring background system (104) transmits an operation instruction to start up the intelligent power source module (103) when necessary, thereby achieving selective control of power supply to the video sensor. The sensor is turned on when video monitoring is required and turned off when the video monitoring is not required. In this way, the service life of the sensor may be greatly prolonged. The man-machine interaction module (105) acquires data from the video monitoring background system (104) and displays the data to a user, where the video data may be displayed in the form of a main-wiring diagram, and the user may click an identification point on the main-wiring diagram to obtain a video image at a corresponding time instant.

The hardware of the video monitoring background system (104) may be implemented with a computer. The video monitoring background system (104) is configured to process, analyze and manage the video data, and is connected with the video server (102) through a network interface. In a case of multiple video servers, a network switch may be used for networking. The video monitoring background system (104) may receive signals from multiple video servers (102), analyze and process the signals and display monitored data on a man-machine interaction interface in the form of the main-wiring diagram. The monitored data is stored in a database set up in the video monitoring background system (104). The system has a user management function, a video decoding function, a video capture function (a current one frame of the video is stored as an image when a video capture function button is clicked during video acquisition), a video recording function (the video is acquired as a video recording, however, the video recording is not stored unless a video recording function button is clicked) and the like.

Figure 5:
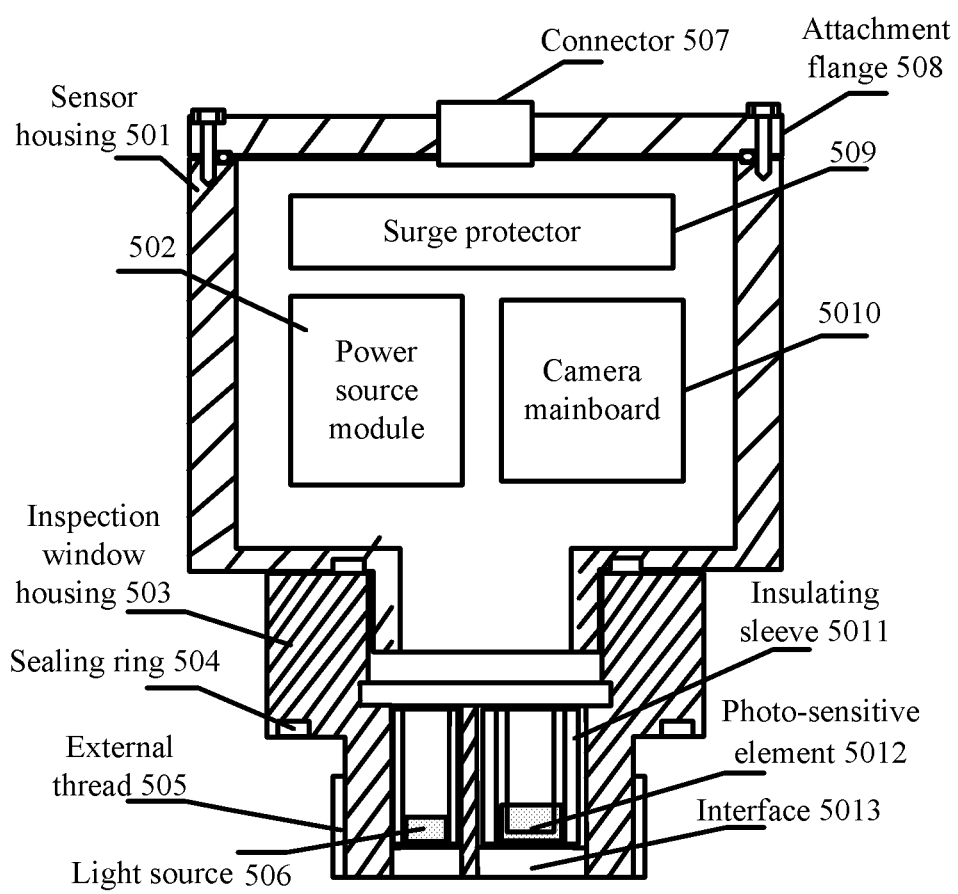
FIG. 5 is a structural diagram of the video sensor.

In the present example, as shown in FIG. 5, the video sensor includes a sensor housing (501), an inspection window housing (503), an attachment flange (508), a connector (507), a photo-sensitive element (including an optical lens) (5012), a light source (506), a power source module (502), a surge protector (509) and a camera (5010). An interface (5013) between the inspection window housing (503) and the GIS enclosure is made of light-transmitting glass. The sensor housing (501) is connected with the inspection window housing (503) through an external thread (505) and an internal thread. The connector (507) is provided on the attachment flange (508), the attachment flange (508) is connected with the sensor housing (501) with screws. The connector is a 4-pin connector which is connected with the video server via the cable. The optical inspection window is configured to enable video sensor tightness and light transmission.

An O-type shield ring is arranged between the inspection window housing (503) and the GIS enclosure.

The light source and the photo-sensitive element (including the optical lens) (5012) are respectively arranged within two parallel mounting chambers within the inspection window housing (503), and isolated with each other with an insulating sleeve (5011) to avoid glare interference. For example, the light source may be arranged within a first mounting chamber within the inspection window housing 3, and the photo-sensitive element (including the optical lens) (5012) may be arranged within a second mounting chamber parallel to the first mounting chamber. Further, an insulating sleeve (5011) is provided on an outer circumference of the photo-sensitive element (including the optical lens) (5012) to prevent the light source and the photo-sensitive element (including the optical lens) from contacting directly with the sensor housing, thereby avoiding electrostatic interference.

The surge protector (509) is arranged on a power input terminal and a signal output terminal to prevent external over-voltage interference from applying on circuits within the sensor. A sealing ring (504) is arranged directly on the contacting surface between the inspection window housing (503) and the GIS enclosure to prevent gas leakage of the GIS. A power source module is further provided within the sensor housing (501) to supply power to the light source and the photo-sensitive element. The input voltage of the power source module is 24 V, and the output voltages of the power source module are 3.3 V and 5 V, of which 3.3 V is for the photo-sensitive element and 5 V is for the light source module. The surge protector is arranged between an external circuit and the sensor circuit.

Figure 2:
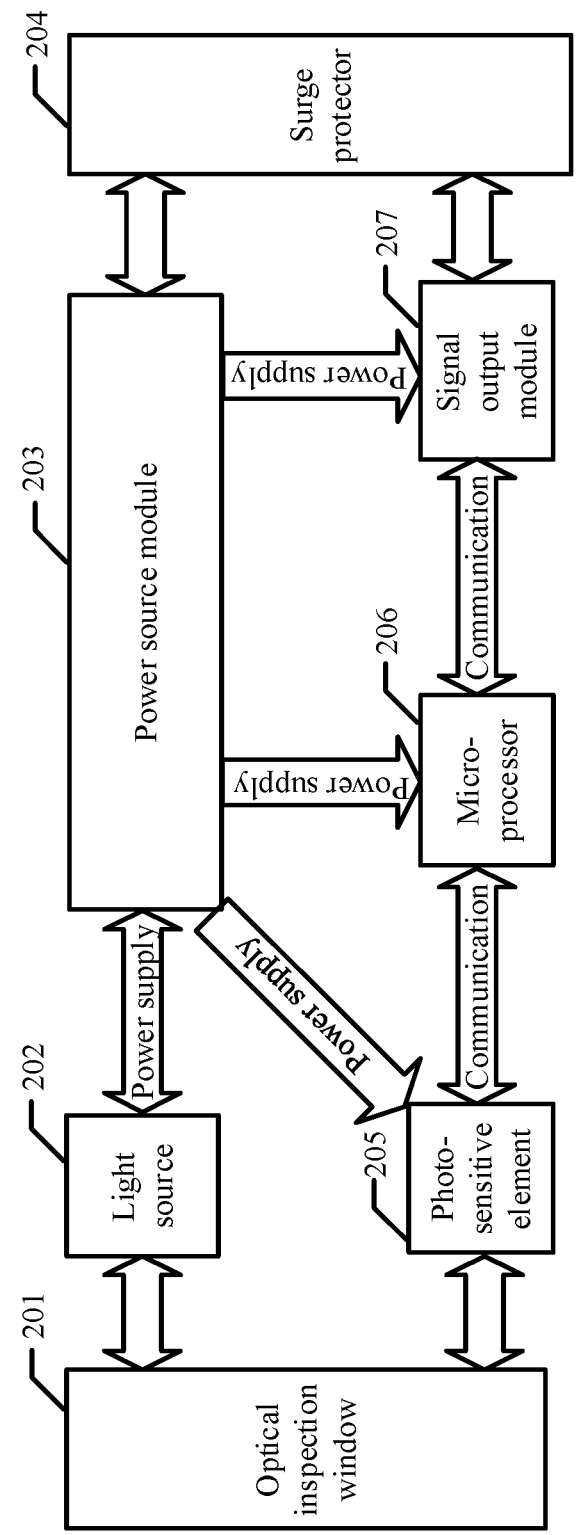
FIG. 2 is a working principle diagram of a video sensor.

FIG. 2 illustrates a working principle diagram of the video sensor. A light source (202) provides illumination to internal components of the GIS, thereby ensuring that the photo-sensitive element can acquire clearly image information on the contacts. After the image information on the contacts is acquired, the photo-sensitive element (205) transmits the acquired image information to the microprocessor (206). The microprocessor (206) encodes and processes the image information and transmits the encoded and processed image information via a signal output module (207). A power source module (203) supplies power required by each module. A surge protector (204) is connected with the power source module (203) and the signal output module (207) in order to prevent external surge signals from affecting the video sensor.

Figure 3:
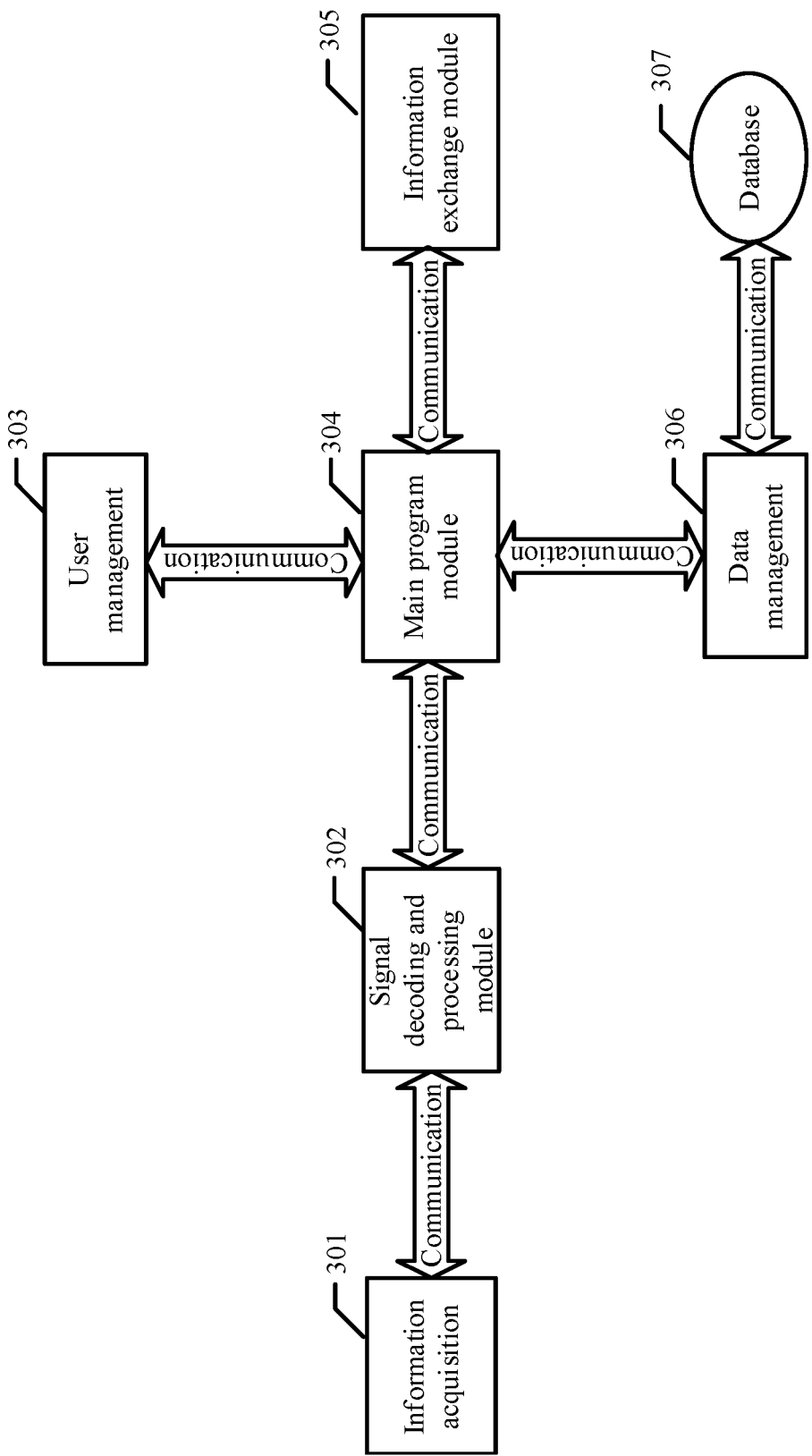
FIG. 3 is a principle diagram of a video monitoring background system.

FIG. 3 illustrates a principle diagram of the GIS conductor video monitoring background system. The video monitoring background system includes a main program module (304), a user management module (303), an information exchange module (305), a data management module (306), a signal decoding and processing module (302), an information acquisition module (301), a database (307) and the like. The video signal is transmitted to the video monitoring background system in accordance with the TCP/IP protocol, and is categorized and decoded by the signal decoding and processing module (302), and the decoded data is transmitted into the main program module (304). The main program module (304) is configured to coordinate the operation of the entire system, such as enabling user login and user operation, coordinating the display and storage of video information. All monitoring information is stored in the database (307) to facilitate invocation.

Figure 4:
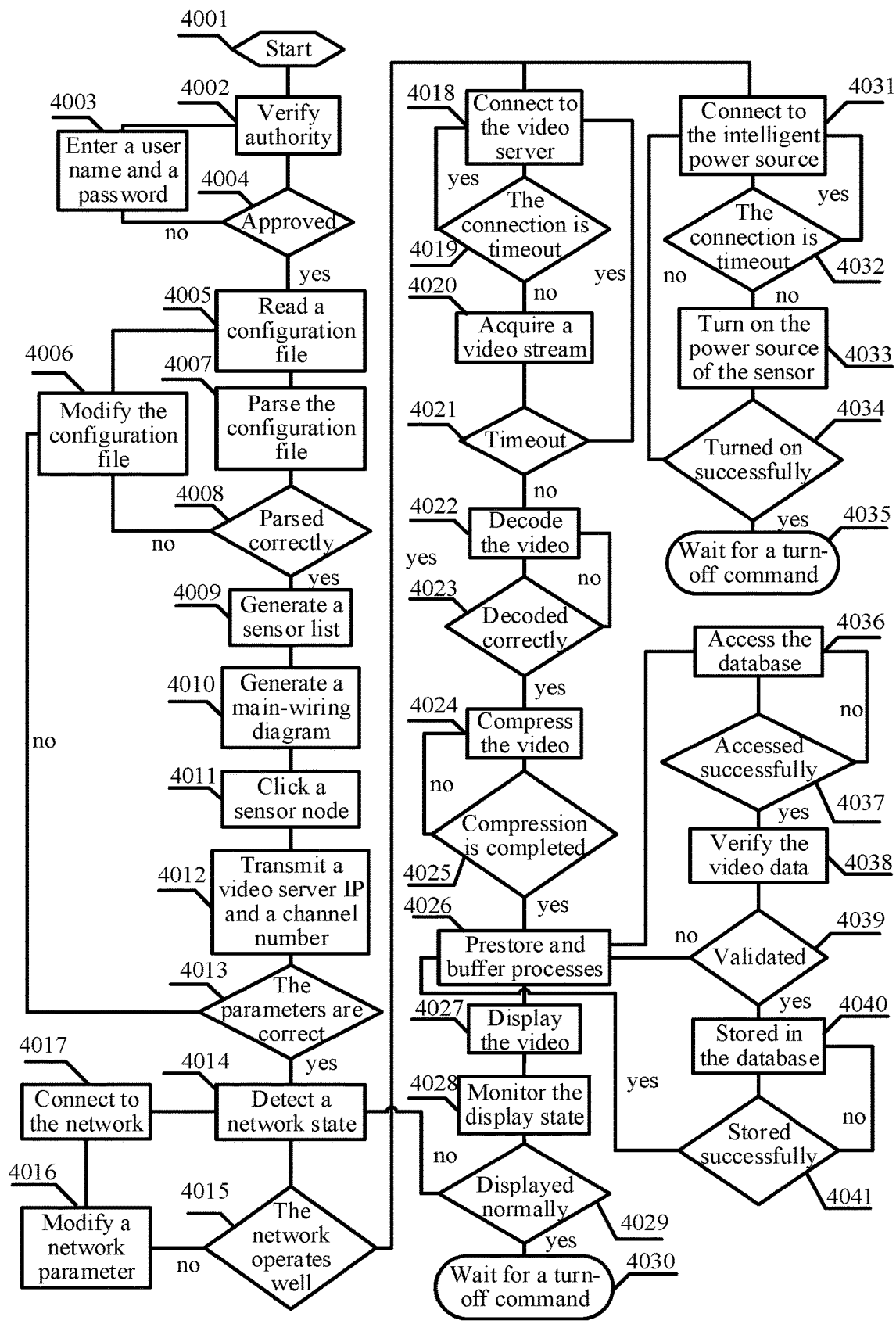
FIG. 4 is a flow chart of a process performed by the video monitoring background software system.

FIG. 4 illustrates a main flow chart of a process performed by the conductor video monitoring background system. The whole process from the user login to video display and video storage is described in detail in the flow chart. The process starts at step (4001), and proceeds to an authority verification step (4002), where a user is required to enter a user name and a password, and the entered user name and password are matched with user names and passwords pre-stored in the system; if the match is successful, the verification is approved (4004), and if the match is unsuccessful, the user is required to re-enter a user name and a password. After the verification is approved (4004), a configuration file is read (4005), and then the configuration file is parsed (4007), The configuration file is a parameter description file for the entire video monitoring system, which includes an IP address for the video server, a correspondence between the video server and the video sensor, and configuration information of multiple monitoring points. The video monitoring system may obtain configuration parameters for the entire system through the configuration file, and generates a video sensor list and a main-wiring diagram of the conductor video monitoring system based on the configuration parameters. If the parsing fails, a parsing function returns 0, and the user is required to modify the configuration file (4006), and if the parsing is successful, the parsing function returns 1, and the sensor list is generated (4009). After the sensor list is generated, the system main-wiring diagram is generated (4010) and displayed to the user. When a sensor node on the main-wiring diagram is clicked by the user (4011), the system may transmit a video sensor IP address and a channel corresponding to the sensor node (4012) and examines formats of parameters of the IP address and the channel number to determine whether the parameters are correct (4013). If the parameters are not correct, the configuration file needs to be modified (4006), and if the parameters are correct, a network state is detected (4014). It is determined whether the network operates well by detecting connect states between network hardware, for example, performing network detection using a ping command (4015), if the network does not operate well, a network parameter is modified (4016), and then the connection to the network is reestablished (4017); if the network operates well, a connection to the video server is established (4018) and a connection to the intelligent power source is established (4031). When the connection to the intelligent power source module is established, connection time is monitored and it is determined whether the connection is timeout (4032), if the connection to the intelligent power source module is time out, the connection is reestablished and a system warning is provided, and if the connection is successful, a power source start-up command is transmitted to the intelligent power source module, and the power source of the sensor is turned on (4033). If the intelligent power source module is successfully started up, a command indicating the operation is successful is returned, and the process precedes to step (4035) where the system enters a state waiting for a turn-off command, and if the command indicating the operation is successful is not returned, the connection to the intelligent power source module is reestablished (4031). When the connection to the video server is established, connection time is monitored and it is determined whether the connection is timeout (4019), if the connection to the server is timeout, the connection is reestablished, and if the connection is successful, a video flow is acquired (4020). The video flow may be acquired according to the IP address of the video server and the channel number. During acquisition of the video stream, acquisition time is monitored, and it is determined whether acquisition of the video stream is timeout (4021); if the acquisition of the video stream is timeout, the process returns to step (4018) where the connection to the video server is reestablished, and if acquisition of the video stream is not timed out, a video is decoded according to an encoding format (4022). Then it is determined whether the decoding is successful (4023), if a decoding function returns 0, the decoding fails, and if the decoding function returns 1, the decoding is successful, and then the video is compressed (4024). A video compression (4024) module compresses the video, detect a size of the compressed packet and determines whether the compression is complete according to a data requirement (4025). If the data requirement is met, it is indicated that the compression is complete, and the process proceeds to pre-store and buffer processes (4026) where data is stored in a buffer region. Then video data is read from the video buffer region and displayed (4027). Meanwhile, a display state is monitored (4028) and it is determined whether the display state is normal (4029), if the display state of the video is abnormal, the network state is detected (4014), and if the display state is normal, the process precedes to step (4030) where the system enters the state waiting for a turn-off command. Meanwhile, the data storage module reads data from the video buffer region and stores the data into a database, where, firstly, a database is accessed (4036) according to database connection information in the configuration file, then it is determined whether the database is successfully accessed (4037), if the database is not successfully accessed, the database is re-accessed (4036), and if the database is successfully accessed, the video data is verified (4038). The video data may be verified according to the encoding format of the video data. Then it is determined whether verification is validated (4039), if the verification is not validated, data is re-read from the video buffer region, and if the verification is validated, the data is stored in the database (4040), and a database modification state is returned. Further, it may also be determined whether the data is successfully stored (4041), if the data is successfully stored, new data may be read from the prestore and buffer region and a next loop is initiated, and if the data is not successfully stored, the data is re-stored (4040).

The entire conductor video monitoring system is networked through Ethernet, and each of the video servers is connected through the network switch. The conductor video monitoring background system is installed on a background monitoring host and connected with the switch to acquire video information of each of the monitoring points through Ethernet. The video signal is transmitted in H.264 coding format based on the TCP/IP protocol, and each of the video signals is identified based on the IP address and a channel number. The intelligent power source used in the conductor video monitoring system may be an intelligent power source module controlled through the network, which is turned on by a network command when a video window is opened by the conductor video monitoring system and turned off when the video window is closed by the conductor video monitoring system. With this system, the service life of the sensor may be prolonged, and interferences and influences on the conductor video monitoring system caused by switching apparatus operation failures may be effectively avoided. The intelligent power supply system communicates by using the Modbus TCP communication protocol. The background software of the conductor video monitoring system also has the video capture function and the video recording function. The video data and the image data are stored in the database in binary files, and indexed with a serial number of the video sensor and storing time. Further, the captured image and the recorded data may also be stored in a hard drive of the computer to be stored in a mobile device easily.

A GIS internal conductor video monitoring method according to the embodiments of the present disclosure includes the following steps (1) to (6).

In step (1), a video viewing command is transmitted by the video monitoring background system to turn on the intelligent power source module using the Modbus TCP protocol, in order to supply power to the video sensor, where the sensor is provided with 24V power supply.

In step (2), a video signal of the GIS internal conductor is acquired by the video sensor installed within the GIS enclosure and transmitted to the video server via the signal cable, where video monitoring of the positions of the disconnector contact, the earthing switch contact, and the fast earthing switch contact may be achieved with the sensor.

In step (3), after the video signal is received by the video server, the video server decodes and recodes the video signal, and transmits the data to the video monitoring background system in accordance with the TCP/IP protocol.

In step (4), a serial number of the sensor is acquired and sensor data is categorized by the video monitoring background system by decoding and analyzing the received data. The video information may be obtained by clicking a node corresponding to the video information on the video monitoring background system.

Specifically, the video monitoring background system decoding and analyzing the digital signal includes:

the video monitoring background system identifying different video information flows based on IP addresses and channel numbers after the video monitoring background system receives the video signal;

the video monitoring background system starting up the intelligent power source module after the video information flows are identified correctly;

the video monitoring background system decoding and recoding the received video signal to acquire a serial number of the video sensor;

the video monitoring background system categorizing sensor data, extracting an effective video image and storing the video image; and the video monitoring background system closing a monitoring video window and transmitting an instruction to turn off the intelligent power source module to the intelligent power source module.

In step (5), when the video information is acquired by the video monitoring background system, the monitoring screens may be captured or recorded if desired, and all the monitoring data may be stored in a database for future retrieval and viewing.

In step (6), when monitoring video viewing is finished, the monitoring video window is closed, and a sensor power off instruction is automatically transmitted to the intelligent power source module for the sensor by the monitoring background software to terminate the power supply for the video sensor.

According to the disclosure, a video of GIS internal conductor can be acquired, and the video signal is converted to a network signal and transmitted to the video monitoring background system, thereby achieving remote monitoring and centralized management of the open/close states of the disconnector contact, the earthing switch contact, and the fast earthing switch contact in the GIS.

According to the above description of the disclosed embodiments, those skilled in the art can implement or practice the present disclosure. Many changes to these embodiments are apparent for those skilled in the art, and general principles defined herein may be implemented in other embodiments without departing from the spirit or scope of the present disclosure. Hence, the present disclosure is not limited to the embodiments disclosed herein, but is to conform to the widest scope in accordance with the principles and novel features disclosed herein.

The invention claimed is:

1. A gas insulated switchgear (GIS) internal video monitoring system, comprising: a video sensor, a video server, an intelligent power source module and a video monitoring background system, wherein
the GIS-video sensor is installed on a GIS enclosure and configured to acquire an a state of a GIS internal conductor in a real time manner and transmit the state to the video server in the form of a video signal, the state of the GIS internal conductor indicating whether a disconnector contact, an earthing switch contact or a fast earthing switch contact is closed, wherein the video sensor further comprises:
an inspection window housing fixed on the GIS enclosure, wherein an O-type shield ring is arranged between the inspection window housing and the GIS enclosure;
an interface between the inspection window housing and the GIS enclosure being made of light-transmitting glass;
a light source and a photo-sensitive element respectively arranged within two parallel chambers of the inspection window housing; and
an insulating sleeve is provided on an outer circumference of the photo-sensitive elements;
the video server is configured to:
receive the video signal transmitted by the video sensor;
convert the video signal to a digital signal; and
transmit the digital signal to the video monitoring background system;
a video server; and
the video monitoring background system is connected with the video sensor through the video server, and is configured to:
receive the digital signal from the video server;
decode and analyze the digital signal to acquire a serial number of the video sensor;
categorize the digital signal as a corresponding node on the video monitoring background system based on the serial number of the video sensor; and
extract and store a video image corresponding to a node selected by a user; and
the intelligent power source module is configured to be turned on to supply power to the video sensor when the video monitoring background system is to receive the video signal.

2. The GIS internal video monitoring system according to claim 1, wherein communication between the video server and the video monitoring background system is performed in accordance with the Transmission Control Protocol/Internet Protocol (TCP/IP) protocol.

3. The GIS internal video monitoring system according to claim 1, wherein, in the video sensor, an input terminal of a power source module and an output terminal of a signal output module are connected with a surge protector.

4. The GIS internal video monitoring system according to claim 1, wherein the video monitoring background system comprises a main program module, a data management module, an information exchange module and a signal decoding and processing module, and the main program module is connected with the data management module, the information exchange module and the signal decoding and processing module.

5. A gas insulated switchgear (GIS) internal video monitoring method,
a video monitoring background system configured to control the intelligent power source module to supply power to the video sensor, wherein
comprising:
acquiring, by a video sensor installed on a GIS enclosure, a state of a GIS internal conductor in a real time manner, the state of the GIS internal conductor indicating whether a disconnector contact, an earthing switch contact or a fast earthing switch contact is closed;
transmitting, by the video sensor, the state to a video server in the form of a video signal via cable;
converting, by the video server, the video signal to a digital signal after the video server receives the video signal;
transmitting, by the video server, the digital signal to a video monitoring background system in accordance with the Transmission Control Protocol/Internet Protocol (TCP/IP) communication protocol, wherein the video monitoring background system is connected with the video sensor through the video server;
decoding and analyzing, by the video monitoring background system, the digital signal to acquire a serial number of the video sensor after the video monitoring background system receives the digital signal;
categorizing, by the video monitoring background system, the digital signal as a corresponding node on the video monitoring background system based on the serial number of the video sensor;
extracting and storing, by the video monitoring background system, a video image corresponding to a node selected by a user; and
displaying, by the video monitoring background system, an acquired analysis result to a user in the form of a screen,
wherein an intelligent power source module is configured to be turned on to supply power to the video sensor when the video monitoring background system is to receive the video signal, and
wherein the video sensor comprises:
an inspection window housing fixed on the GIS enclosure, wherein an O-type shield ring is arranged between the inspection window housing and the GIS enclosure;
an interface between the inspection window housing and the GIS enclosure being made of light-transmitting glass;
a light source and a photo-sensitive element respectively arranged within two parallel chambers of the inspection window housing; and
an insulating sleeve is provided on an outer circumference of the photo-sensitive element.

6. The GIS internal video monitoring method according to claim 5, wherein the video monitoring background system starts up an intelligent power source module to supply power to the video sensor by opening a monitoring video window on the video monitoring background system when the video monitoring background system is to receive the video signal.

7. The GIS internal video monitoring method according to claim 5, wherein the steps of decoding and analyzing, categorizing, extracting and storing further, comprises:
identifying, by the video monitoring background system, different video information flows based on IP addresses and channel numbers after the video monitoring background system receives the digital signal;

starting up, by the video monitoring background system, the intelligent power source module after the video information flows are identified correctly;

decoding and recoding, by the video monitoring background system, the received digital signal to acquire the serial number of the video sensor;

categorizing, by the video monitoring background system, sensor data, extracting, by the video monitoring background system, the corresponding video image based on the user's selection and storing, by the video monitoring background system, the video image; and closing, by the video monitoring background system, the monitoring video window and transmitting, by the video monitoring background system, an instruction to turn off the intelligent power source module to the intelligent power source module.

\* \* \* \* \*